Figure 1:
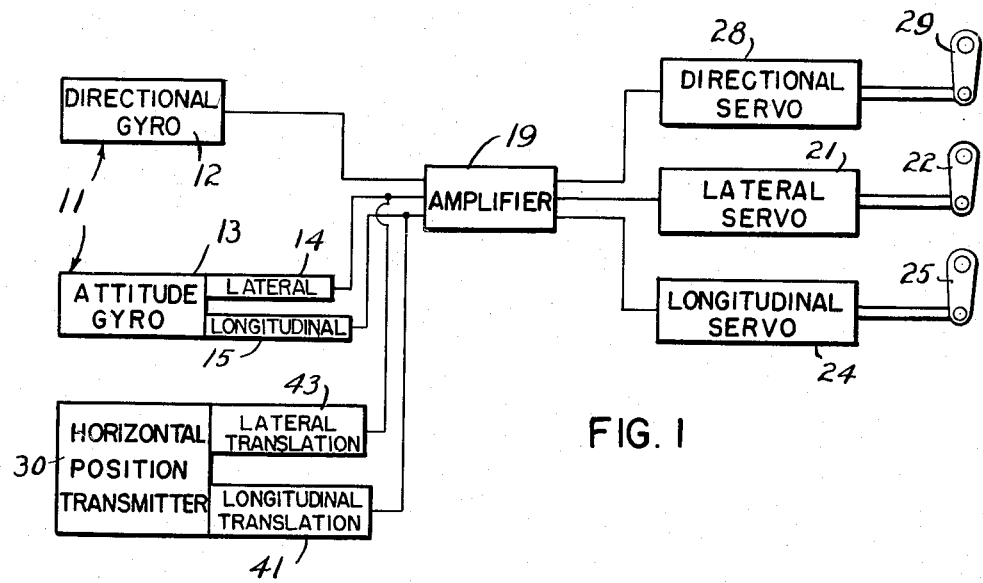

Aug. 25, 1953  E. G. VANDERLIP  2,650,046
AUTOMATIC CONTROL FOR HELICOPTERS
Filed Dec. 14, 1950  2 Sheets-Sheet 1

INVENTOR
Edward G. Vanderlip

Aug. 25, 1953     E. G. VANDERLIP     2,650,046
AUTOMATIC CONTROL FOR HELICOPTERS
Filed Dec. 14, 1950     2 Sheets-Sheet 2

INVENTOR
Edward G. Vanderlip

Patented Aug. 25, 1953

2,650,046

UNITED STATES PATENT OFFICE 2,650,046

AUTOMATIC CONTROL FOR HELICOPTERS

Edward G. Vanderlip, Radnor, Pa., assignor to Piasecki Helicopter Corporation, Morton, Pa.

Application December 14, 1950, Serial No. 200,714

5 Claims. (Cl. 244—17.13)

This invention relates to rotary wing aircraft and more particularly to an automatic control system therefor.

Because of the inherent instability characteristics of rotary wing aircraft it is necessary for the pilot to constantly correct for any deviations in attitude of the aircraft, which corrections must be made in addition to his regular piloting manipulations in keeping the aircraft in a condition of "hovering" flight relative to a fixed spot on the earth's surface, or in maintaining the aircraft along the course which he wishes to pursue.

The pilot must in addition compensate for changes in altitude. Although the altitude of the aircraft can be changed by varying the engine R. P. M. (lift being a function of blade speed), this means of varying the altitude is not always desirable due to the fact that the rotor blades and engine are designed for a predetermined speed of rotation. In addition, engine inertia and blade inertia delay the corrective process. It has been found that the most desirable method of correcting for deviations in altitude of a helicopter is by changing the collective pitch setting of the rotor blades. Altitude sensitive devices may be set for a selected altitude and any deviations sensed by the devices are conveyed to control mechanisms which change the collective pitch of the blades. However, if the pitch angle of the blades is increased the drag of the rotor blades is increased thus decreasing the speed of the engine. This reduction in engine speed must be prevented by a change in throttle adjustment to enable the engine to increase its power to maintain the desired operating speed. If the pitch angle of the blades is decreased a reverse adjustment is necessary.

Should the engine fail to deliver power, however, it is necessary to rely on autorotative flight to maintain a safe rotor speed. In such an event the altitude sensing devices and their related control means would operate in an undesired manner in that loss of altitude of the aircraft would result in a higher pitch setting that would dangerously slow down the rotors. To take care of this condition a different means of controlling the pitch setting of the blades is necessary.

The principal object of this invention is to provide complete automatic flight wherein automatic control is provided about the three major axes and the altitude of the helicopter is controlled by barometric or water pressure sensing devices; wherein reference of the aircraft over a fixed point on the earth's surface is maintained and wherein a constant rotor R. P. M. with and without engine power is maintained.

Another object of this invention is to maintain a constant vertical position of the helicopter relative to a fixed point on the earth's surface.

Another object of this invention is to maintain a fixed position in space to prevent translation of the craft with respect to a fixed point on the earth's surface.

A further object of this invention is to control the rotor R. P. M. by varying the pitch adjustment of the rotor when the engine is in an inoperative state.

Another object of this invention is to provide two altitude sensitive means and manual means for selecting the same.

Another object of this invention is to provide two means of controlling the rotor R. P. M. with automatic means to select this control, said automatic means being responsive to relative changes of rotor R. P. M. and engine R. P. M.

A further object of this invention is to provide in a rotary wing aircraft, apparatus for correcting for displacement of said aircraft about its principal axes, apparatus for correcting for displacement of said aircraft from a predetermined altitude, and apparatus for correcting for translational displacement of said aircraft at a predetermined altitude relative to a fixed position on the earth's surface, including two means of controlling the altitude and two means of controlling the rotor R. P. M.

Attainment of the above stated objects greatly increases the utility and efficiency of helicopters. This is particularly true in rescue and survey operations.

Figure 2:
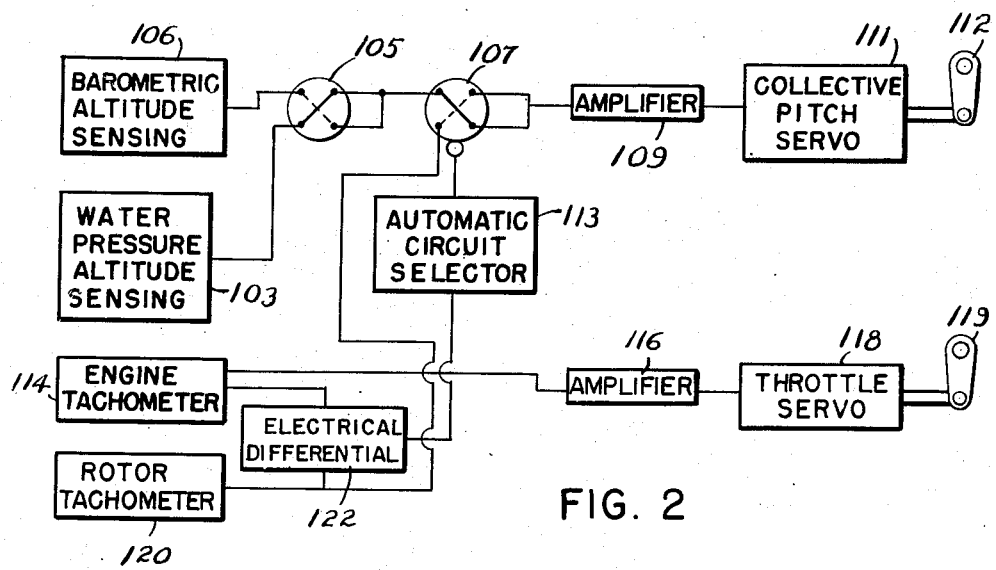
Figure 3:
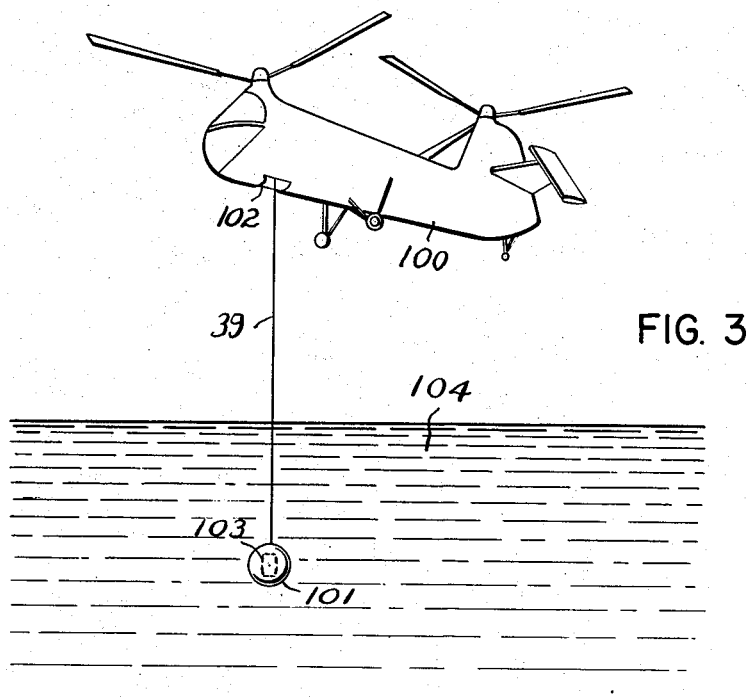
Figure 4:
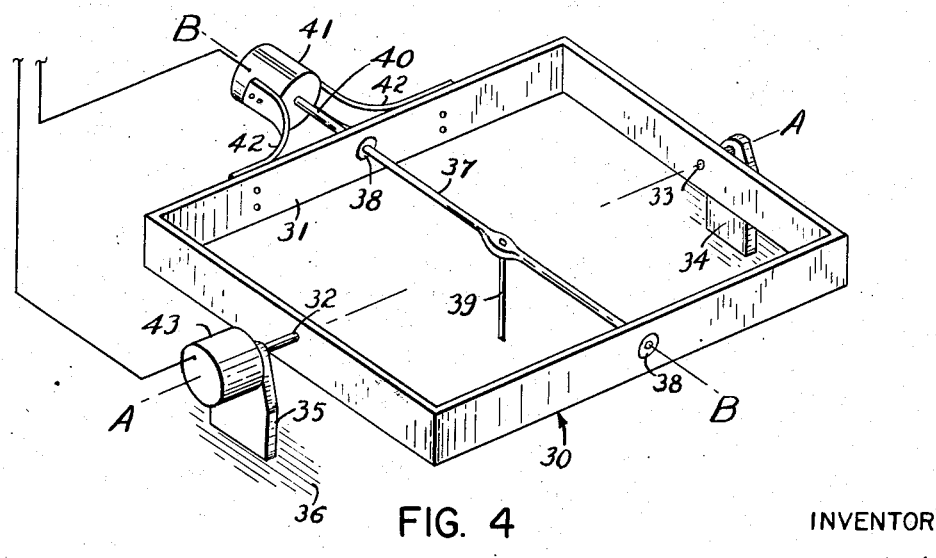

Other objects and advantages will become apparent from the specification taken in connection with the accompanying drawings wherein:

Figure 1 represents a schematic diagram of an automatic pilot, comprising in combination, attitude, and horizontal position sensing means, amplifiers, servos and control means installed in a conventional helicopter, Figure 2 represents a schematic diagram of altitude control comprising barometric and water pressure altitude sensing devices, amplifiers, servos and control means installed in a helicopter, Figure 3 represents a perspective view of a helicopter in hovering flight with water pressure altitude and translational sensing means suspended therefrom, Figure 4 represents a perspective view of horizontal position sensing means and transmitters carried in the helicopter.

Referring to the Figure 3, a helicopter is shown in which is installed a conventional gyropilot. The gyropilot is connected as a part of an automatic control system and operates in conjunction with the helicopter's controls such as are shown and described in Patent No. 2,555,577. All deviations from a reference position are detected and the aircraft is returned. In the above mentioned gyropilot the reference position is established by two gyroscopes, one in the directional gyro 12 and one in the attitude gyro 13 (see Figure 1).

The gyroscope in the attitude gyro establishes both roll and pitch references of the aircraft. The roll reference is a level attitude of the aircraft about its roll axis, the roll axis being an axis passing longitudinally through the aircraft about which the lateral control acts. The pitch reference is a level attitude of the aircraft about its pitch axis, the pitch axis being an axis passing laterally through the aircraft about which the longitudinal control acts. Any deviation of the aircraft from the lateral (roll) reference, established by the gyroscope is sensed by the lateral sensing means 14 and the signal sensed by said sensing mean is fed to an amplifier 19. The amplified signal is then fed to a lateral servomotor 21 which actuates the lateral controls 22 of the helicopter. Likewise any deviation of the aircraft about its longitudinal (pitch) axis is sensed by the longitudinal sensing means 15. The signal generated is fed to amplifier 19. The amplified signal is then fed to the longitudinal servo 24 which is turn actuates the longitudinal controls 25 of the helicopter.

Deviations sensed by the directional gyro 12 are in a similar manner electrically fed to amplifier 19 and the amplified signal is then fed to the directional servo 28 which actuates the directional controls 29 of the aircraft. As before mentioned this portion of the automatic control system is well known in the aircraft art.

Figure 3 shows a helicopter 100 in a position of "hovering" flight over a body of water. A spherical weight 101 is suspended through an aperture 102 of said helicopter into a body of water 104. Any translational movement of the aircraft while in the "hovering" condition of flight will produce a "drag" on cable 39 which will in turn be reflected or sensed by a horizontal position transmitter 30 electrically connected to the aforementioned automatic pilot circuit.

Referring to Figure 4 it will be seen that said transmitter 30 which is preferably located in the lower portion of the fuselage of the helicopter comprises a gimbal ring 31 mounted by means of shafts 32—33 and gimbal bearings 34—35 to the fuselage floor 36. The gimbal ring 30 is freely mounted to rock about the axis A—A, said axis A—A being parallel to the longitudinal or rolling axis of the aircraft.

A shaft 37 is mounted by means of suitable bearings 38 transversly across gimbal ring 31 at right angles to the axis A—A to permit relative movement between said shaft and said ring about the B—B axis. Midway between the bearings a cable 39 is rigidly affixed to the shaft 37. A suitable transmitter or rotary transformer 41 of a type such as an "Autosyn" or "Selsyn" hereinafter to be referred to as the longitudinal translational unit 41 (Figure 1) is rigidly fastened to ring 31 by brackets 42. A rotor winding housed within the transformer 41 and secured to shaft extension 40 is turned relative to a stator winding also housed within said unit upon rotary movement of shaft 37. The rotor winding is connected to a source of current potential which is not shown. The voltage induced in the stator winding of the longitudinal translational unit 41 is carried by leads to amplifier 19, which in turn energizes the longitudinal servo unit 24 which actuates the longitudinal controls 25.

A second pickoff or lateral translational unit 43, similar to the previously described longitudinal translational unit 41 is rigidly fixed to gimbal bearing 35. Shaft 32 affixed to gimbal ring 31 conveys any rotational movement of said ring to said lateral translational unit 43 and the induced signal in said unit is conveyed by electrical connections 44 to amplifier 19 thence to the lateral servo unit 21, which in turn actuates the lateral controls 22 of the aircraft. Thus it is apparent that the horizontal position transmitter constitutes a unit which is sensitive to universal horizontal translational movement of the helicopter relative to a fixed spot on the earth's surface.

Encased within the spherical weight 101 is a water pressure altitude sensing device 103 which is electrically connected to a manual switch 105. The wires required for this electrical connection are passed up through the center of the cable 39 and cut out through suitable slip rings in the gimbal frame 30 and from there carried over to the switch 105. The wires and slip rings have not been shown. This method of fitting circuits through a cable and gimbal system is well known in the art and is typically exemplified by the constructions found in A-12 and E-6 automatic pilots used in military airplanes. Switch 105 is connected to a second switch 107 which is controlled by an automatic circuit selector 113. The sensing device 103 is of the same design and principle as used in conventional automatic altitude controls except that the pressure element is responsive to changes in water pressure instead of barometric pressure such as shown in Patent No. 2,479,549. The switch 107 carries the signal generated in the water pressure altitude sensing device 103 when the unit 101 is vertically displaced by a change in altitude of the helicopter to amplifier 109 where the signal is amplified and fed to the collective pitch servo 111 which actuates the collective pitch control 112.

An alternate altitude sensing device in the form of a barometric altitude sensing device 106, comprising an aneroid barometer not shown is likewise connected by leads to the manual switch 105. When manual switch 105 is thrown to permit the signal generated in said barometric sensing device to pass through said switch the signal so generated is electrically carried to switch 107, then to amplifier 109 where the signal is amplified and carried to the collective switch servo 111 which operates the collective pitch controls 112. Associated with the above described altitude sensing units is an engine tachometer which is sensitive to any changes of engine speed. These changes occur as the result of collective pitch changes made in response to signals generated in the barometric altitude sensing or water pressure altitude sensing devices just previously described. The engine tachometer control circuit comprises an electrical tachometer 114 energized by a generator not shown which is mechanically driven by the engine drive system. The position of the engine tachometer shaft is used to balance or unbalance an A. C. bridge system contained in the unit 114 which when unbalanced operates through the amplifier 116 to drive the throttle servo 118 to change the throttle setting.

As before mentioned, should the engine fail it would be necessary to rely on autorotative flight to maintain a safe rotor speed. In such an event the tendency of the altitude sensing means would be to increase the pitch setting of the rotor blades in order to increase the altitude of the aircraft. This, however, would not be desirable inasmuch as the kinetic energy of the rotor blades would be insufficient to maintain a safe rotor speed. In case of power failure an alternate means to control rotor speed is provided. This means comprises a rotor tachometer 120 responsive to changes in rotor speed and generates a signal for controlling the collective pitch settings of the blades. In other words the tachometer becomes the "intelligence" whereby pitch change settings are directed. If the rotor speed is insufficient the tachometer senses the deviation and directs a change in the pitch setitng of the blades and, if the rotor speed is too great the angle of attack of the blades is increased thus increasing the aerodynamic resistance to rotation and producing a corresponding slower speed of rotation.

Thus, in the event of power failure the control of rotor speed is automatically switched over to the rotor tachometer circuit whereby the rotative speed of rotor will be maintained substantially constant by changing the collective pitch settings of blades, as changes in rotor speed are sensed by the rotor tachometer. The rotor tachometer control circuit similar to the engine tachometer control circuit is comprised of an electrical tachometer 120 energized by a generator not shown which is mechanically driven by the rotor drive system. The position of the rotor tachometer shaft is used to balance or unbalance an A. C. bridge system which when unbalanced feeds a signal through the switch 107 to the amplifier 109 to drive the collective pitch servo 111 which is mechanically connected to collective pitch controls 112 of the rotor. The selector switch 107 is used to select control of the collective pitch servo and is operated by the automatic circuit selector 113. This selector can be of any of the well known solenoid actuator types wherein the solenoid is controlled by the output of an electrical differential which acts to change the polarity of the solenoid circuit in response to polarity changes in the electrical differential 122 caused by a variation of input voltages received from two different sources and the present instance being the engine tachometer 114 and rotor tachometer 120.

Operation

For the purposes of illustration, a rescue mission at sea under conditions of poor visibility involving the use of the present invention will be described. The helicopter is flown to the scene of the rescue operation during which time: the directional heading is maintained by the automatic directional control means comprising a directional gyro 12, amplifier 19, and servo 28, which is operatively connected to the aircraft directional control 29. The attitude of the aircraft about its roll and pitch axes is maintained by the automatic lateral and longitudinal control means comprising an attitude gyro 13, amplifier 19, and servos 21 and 24. These servos are operatively connected to the aircraft lateral and longitudinal controls. The last mentioned controls are also used to cause horizontal translational movement in fore and aft and sideways directions; automatic altitude control means maintains the flight path at a predetermined altitude. This means is comprised of a barometric altitude sensing device 106, switches 105, 107, amplifier 109, and collective pitch servo 111. The collective pitch servo is operatively connected to the aircraft collective pitch control. Radio or sonic altitude devices could be used instead of the barometric device. The collective pitch control of the aircraft is used to vary the vertical thrust or lift the rotor or rotors.

A constant engine speed is maintained by the automatic engine speed control means comprising an engine speed sensing device 114, amplifier 116, and throttle servo 118. The servo is conected to the engine throttle control. This means is important when automatic altitude control means is used as changes in collective pitch to maintain a constant altitude occur frequently resulting in variations in engine speed that must be compensated for. Although the above automatic control means and the aircraft controls which they operate are conventional and known in the art their functions form an important part of the complete operation of the present invention when it is used to perform operations for which it is designed.

Approaching the scene of the rescue operation, altitude and forward speed are decreased until the helicopter is approximately 30 ft. above the scene of operation and has assumed a hovering attitude. At this time the weight and cable are lowered until the weight is approximately 20 ft. under the surface. When the desired depth has been reached the pilot turns switch 105 to turn on the water pressure unit 103. Selection of this unit is required because of the greater sensitivity and accuracy of control afforded and demanded for this phase of the operation. Should the helicopter rise or fall the change of water pressure on the element 103 will generate a signal to operate the collective pitch control in the proper sense to return the helicopter to its original altitude. Tests have shown that a selected altitude may be maintained within plus or minus a foot. During the actual rescue operation it is also necessary to maintain the helicopter over a spot as close as possible. This is extremely difficult to do manually under adverse weather conditions and further complicated if the pilot must also handle other phases of the operation. The present invention relieves the pilot of control function duties except to moniter the system as this operation is accomplished by the automatic means to control translational movement of the helicopter. This means is comprised of weight 101, cable 33, transmitter 30, working in combination with the attitude gyro 13, amplifier 19, and servos 21 and 24. The translational means function as follows: should the helicopter move in any horizontal direction with respect to the weight 101, the cable 33 will rotate shafts 32 or 33 or both causing the unit 41 and 43 to generate correcting signals which are fed into the longitudinal and lateral channels of the amplifier 19, amplified and transmitted to the lateral and longitudinal servos 21 and 24 to move the aircraft controls in a proper direction to return the helicopter to a position vertically above the weight.

While I have shown and described a preferred embodiment of my invention, it is to be understood that it is susceptible of those modifications which appear within the spirit of the invention and the scope of the appended claims.

I claim:
1. In combination, a rotary wing aircraft having blade pitch changing means for control of the altitude thereof, automatic means to maintain a constant height of said aircraft above a body of water on the earth's surface comprising, means to sense hydrostatic pressure changes, means on said aircraft to suspend said hydrostatic sensing means a predetermined distance below the aircraft and into a body of water, servo means associated with said hydrostatic sensing means and responsive to changes of hydrostatic pressure sensed by said hydrostatic sensing means, said servo means being operatively connected to the aircraft blade pitch changing means to correct for changes of altitude of said aircraft as sensed by said hydrostatic means.

2. In combination, a rotary wing aircraft having means to control horizontal longitudinal and lateral movement of said aircraft and having blade pitch changing means for control of the altitude thereof, an automatic position control comprising, means on said aircraft to establish a reference position on the earth's surface, means to sense changes of horizontal position of said aircraft relative to said established reference position, servo means associated with said horizontal position sensing means and responsive to changes of position sensed by said horizontal position sensing means and operatively connected to the aircraft longitudinal and lateral control means to return said aircraft to its original horizontal position relative to said established reference position on the earth's surface, automatic means to maintain a constant height of said aircraft above a body of water on the earth's surface comprising, means to sense hydrostatic pressure changes suspended from said aircraft a predetermined distance below the aircraft and into a body of water, servo means associated with said hydrostatic sensing means and responsive to changes of hydrostatic pressure sensed by said hydrostatic sensing means, said servo means being operatively connected to the aircraft blade pitch changing means to correct for changes of altitude of said aircraft as sensed by said hydrostatic means.

3. In combination, a rotary wing aircraft having, means to control horizontal longitudinal and lateral movement of said aircraft, said means also controlling motion of said aircraft about its lateral and longitudinal axes, directional control means for control of said aircraft about its yaw axis, an automatic pilot including means to establish a flight reference operatively connected to the means to control said aircraft about its lateral, longitudinal and yaw axes, an automatic position control comprising means to establish a reference position on the earth's surface, means on said aircraft to sense changes of horizontal position of said aircraft relative to said established reference position, servo means associated with said horizontal position sensing means and responsive to changes of position sensed by the horizontal position sensing means and operatively connected to the aircraft longitudinal and lateral control means to return said aircraft to its original horizontal position relative to the said established reference position on the earth's surface, blade pitch changing means for control of the altitude thereof, automatic means to maintain a constant height of said aircraft above a body of water on the earth's surface comprising, means to sense altitude changes of said aircraft above said established reference position, servo means associated with said altitude sensing means and responsive to changes of altitude sensed by said altitude sensing means, said servo means being operatively connected to the aircraft blade pitch changing means to correct for changes of altitude of said aircraft as sensed by said altitude sensing means.

4. In combination, a rotary wing aircraft having flight control means to control the attitude of said aircraft about its lateral and longitudinal axes, said control means also providing control of horizontal movement of said aircraft, and automatic attitude control means connected to said flight control means, said automatic attitude control means comprising means to establish a fixed reference in space and means responsive to changes of attitude of said aircraft relative to said fixed reference and connected to said flight control means for movement thereof to maintain a predetermined attitude of said aircraft relative to said fixed reference, and automatic position means to fix the horizontal position of said aircraft relative to a reference position on the earth's surface, said reference position means comprising means mounted on said aircraft and contacting the earth's surface to establish a reference position and means responsive to changes of said aircraft relative to said reference position, said position responsive means being operatively connected to said reference position means and to said automatic attitude control means to cause corrective motion of said flight controls upon horizontal movement of said aircraft away from said reference position.

5. In combination, a helicopter provided with flight control means for control about its roll and pitch axis, automatic pilot means to sense changes of attitude from a fixed reference comprising a vertical gyro and a servo control, said servo control being operatively connected to said flight control means so as to apply corrective control when said helicopter departs from a level attitude, a cable suspended from said helicopter, the lower end of said cable contacting the surface of the earth to establish a ground reference position on the surface of the earth, signal generating means carried by said aircraft and mounted to be responsive to angular motion of said cable with respect to said helicopter as caused by horizontal movement of said helicopter with respect to said ground reference position, said signal generating means being operatively connected to said servo control for actuation thereof, said combination providing means to position said helicopter over a fixed point on the surface of the earth.

EDWARD G. VANDERLIP.

References Cited in the file of this patent

UNITED STATES PATENTS

| Number | Name | Date |
|---|---|---|
| 1,142,218 | Wood | June 8, 1915 |
| 1,919,089 | Brequet et al. | July 18, 1933 |
| 1,993,414 | Respess | Mar. 5, 1935 |
| 2,023,105 | Smith | Dec. 3, 1935 |
| 2,427,939 | Woods | Sept. 23, 1947 |
| 2,433,344 | Crosby | Dec. 30, 1947 |
| 2,459,268 | Elkins | Jan. 18, 1949 |
| 2,479,549 | Ayres et al. | Aug. 23, 1949 |
| 2,517,150 | Webb | Aug. 1, 1950 |
| 2,529,479 | Bates | Nov. 14, 1950 |